(12) United States Patent
Chiu et al.

(10) Patent No.: US 9,079,316 B1
(45) Date of Patent: Jul. 14, 2015

(54) LENGTH-ADJUSTABLE MECHANICAL ARM

(71) Applicant: HIWIN TECHNOLOGIES CORP., Taichung (TW)

(72) Inventors: Yueh-Ling Chiu, Taichung (TW); Wu-Teng Hsieh, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 15 days.

(21) Appl. No.: 14/147,510

(22) Filed: Jan. 4, 2014

(51) Int. Cl.
  *B25J 17/00* (2006.01)
  *B25J 18/00* (2006.01)
  *B25J 18/02* (2006.01)

(52) U.S. Cl.
  CPC .................................. *B25J 18/025* (2013.01)

(58) Field of Classification Search
  CPC ........... B25J 18/00; B25J 18/02; B25J 18/025
  USPC .............................. 74/490.01, 490.05; 901/27
  See application file for complete search history.

(56) References Cited

U.S. PATENT DOCUMENTS

| 3,648,854 | A  | * | 3/1972 | Potter ......................... 414/744.6 |
| 4,473,249 | A  | * | 9/1984 | Valentine et al. ............. 294/197 |
| 6,267,022 | B1 | * | 7/2001 | Suzuki ........................ 74/490.01 |
| 2013/0174683 | A1 | * | 7/2013 | Roberts ....................... 74/490.03 |

* cited by examiner

*Primary Examiner* — Justin Krause
(74) *Attorney, Agent, or Firm* — Patent Office of Bang Shia (57) ABSTRACT

A length-adjustable mechanical arm includes: a base; a first arm unit having one end formed with a first pivot portion pivoted to the base, and another end formed with a second pivot portion, a second arm unit pivoted to the first arm unit includes a pivot member, an inner sleeve, an outer sleeve and an accessory mounting seat. The length of the second arm unit of the mechanical arm is adjustable by adjusting the inner and outer sleeves, and the second arm unit is switchable between an extended position and a retracted position. Therefore, the mechanical arm can be used for two distance operation.

3 Claims, 8 Drawing Sheets

LENGTH-ADJUSTABLE MECHANICAL ARM

BACKGROUND OF THE INVENTION

1. Field of the Invention

The present invention relates to a mechanical arm, and more particularly to a length-adjustable mechanical arm.

2. Description of the Prior Art

Mechanical arms have been widely used in various fields due to its easy controllability. For example, in mechanical processing field, mechanical arms can be used in combination with machine to pick up work pieces. In medical field, mechanical arms can be controlled by doctor to carry out medical treatment, or in the field of gaming entertainment, mechanical arms can be used to clamp game objects.

Figure 1A:
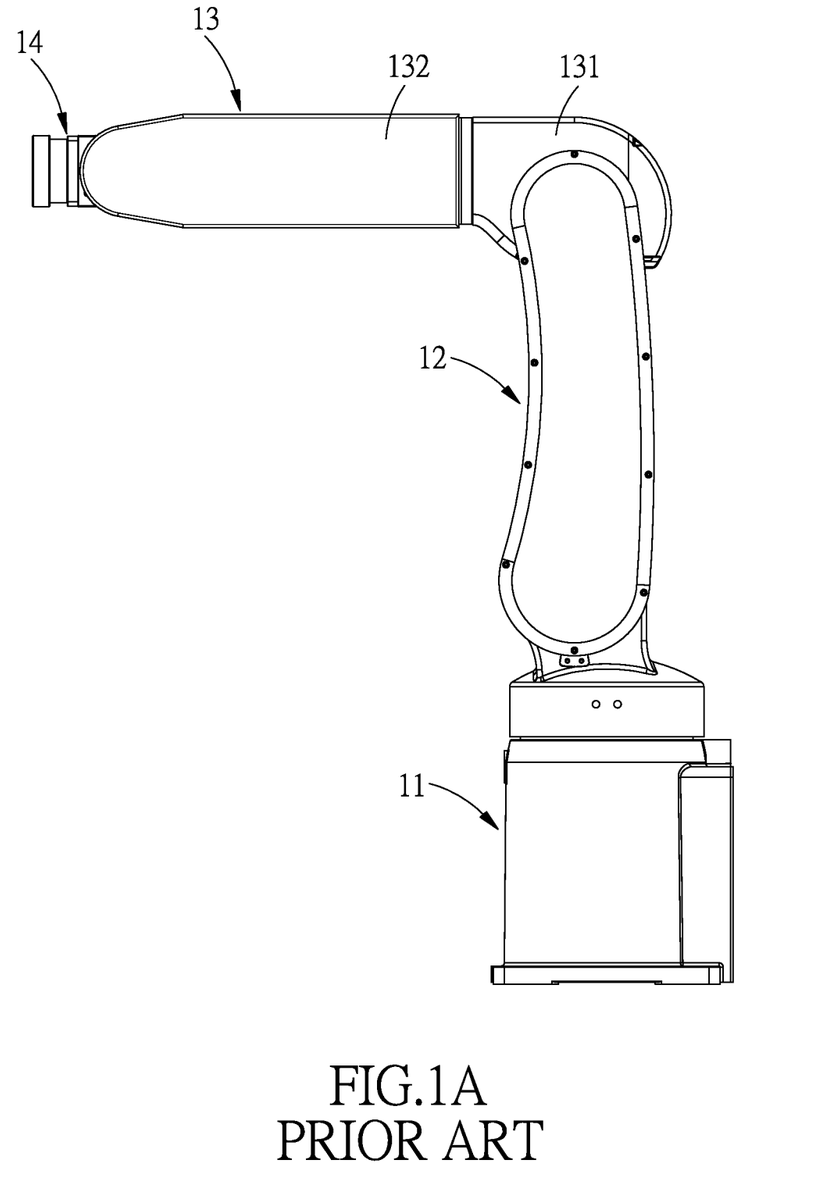
FIG. 1A is a side view of a conventional mechanical arm.

As shown in FIG. 1A, a conventional mechanical arm includes a pivotable base 11, a first arm unit 12 pivoted to the base 11, and a second arm unit 13 pivoted to the first arm unit 12. The second arm unit 13 further comprises a pivot 131 pivoted to the first arm unit 12, a rod 132 fixed to the pivot 131, and an accessory 14 mounted on the rod 132. Motion of the accessory 14 is controlled by controlling of the first and second arm units 12, 13.

Figure 1B:
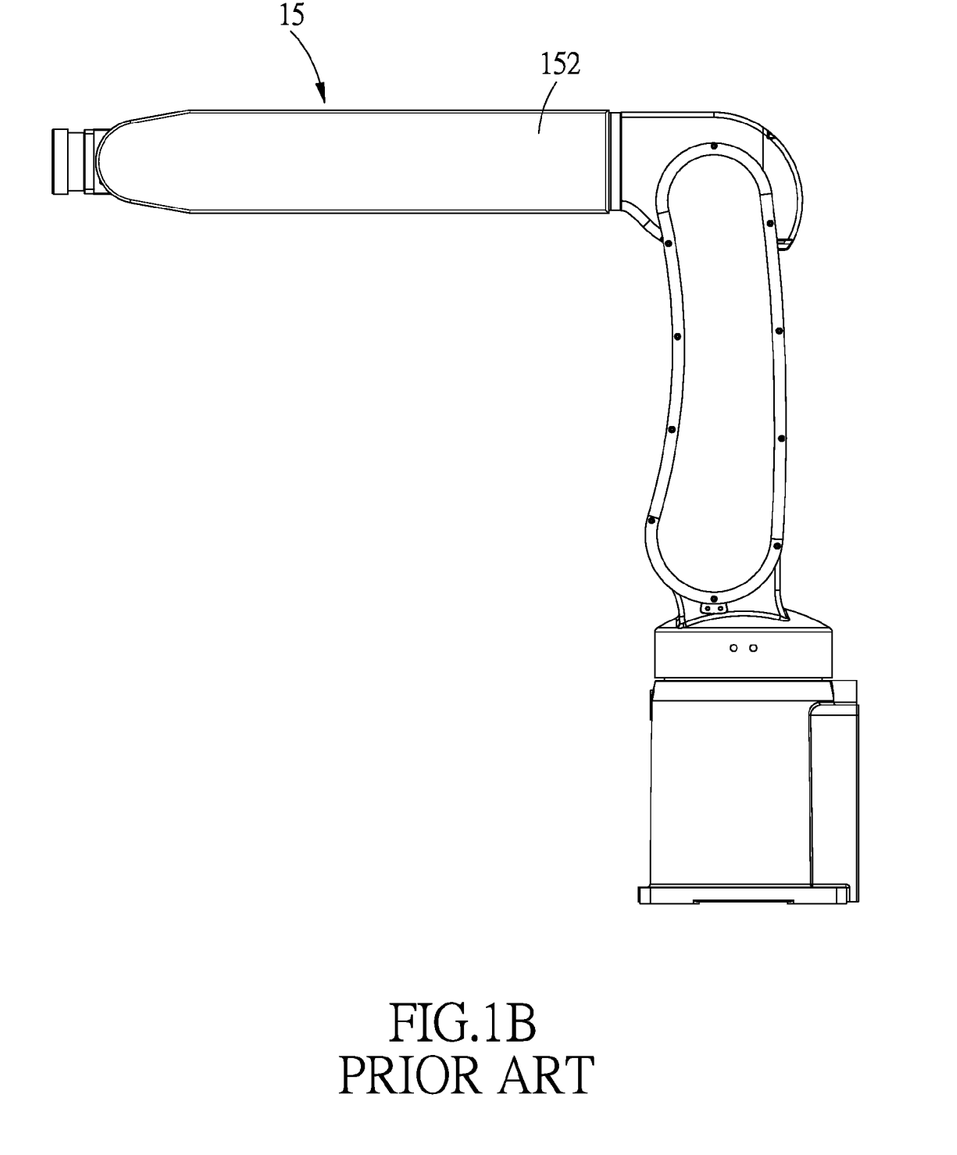
FIG. 1B is a side view of another conventional mechanical arm.

However, the length of the rod 132 of the second arm unit 13 is fixed and unadjustable, this mechanical arm can only be used for fixed distance operation. Once the operation distance is changed, it has to use another mechanical arm of different length. For example, another mechanical arm rod 152 of the second arm unit 15 as shown in FIG. 1B is longer than the rod 132 of the second arm unit 13 as shown in FIG. 1A is used for longer-distance operation.

The present invention has arisen to mitigate and/or obviate the afore-described disadvantages.

SUMMARY OF THE INVENTION

The primary objective of the present invention is to provide a length-adjustable mechanical arm which can be used for two distance operation.

To achieve the above objective, a length-adjustable mechanical arm in accordance with the present invention comprises: a base; a first arm unit including one end formed with a first pivot portion pivoted to the base, and another end formed with a second pivot portion; a second arm unit pivoted to the first arm unit and including a pivot member, an inner sleeve, an outer sleeve and an accessory mounting seat. The pivot member is pivoted to the second portion of the first pivot arm unit, the inner sleeve has one end formed with an inner fixing portion fixed to the pivot member, another end formed with an inner locking portion, the outer sleeve is slidably sleeved on the inner sleeve and slides between an extended position and a retracted position with respect to the inner sleeve, the outer sleeve includes a first outer locking portion located between the inner fixing portion and the inner locking portion, and a second outer locking portion which is located further away from the first outer locking portion than the inner locking portion, when in the extended portion, the first outer locking portion and the inner locking portion are fixed to each other, and when in the retracted position, the second outer locking portion and the inner locking portion are fixed to each other, the accessory mounting seat is fixed on the second outer locking portion of the outer sleeve.

Preferably, the inner sleeve further includes a first inner locking surface at one side of the inner locking portion, a second inner locking surface which is located at another side of the inner locking portion and between the first inner locking surface and the inner fixing portion, the first outer locking portion of the outer sleeve further comprises a first outer locking surface located toward the second inner locking surface, the second outer locking portion includes a second outer locking surface located toward the first inner locking surface, when in the extended position, the first outer locking surface is abutted against the second inner locking surface, and when in the retracted position, the second outer locking surface is abutted against the first inner locking surface.

Preferably, the inner sleeve includes an outer surface between the inner fixing portion and the inner locking portion, and an outer abutting surface which is formed on an outer surface of the inner locking portion and located between the first and second inner locking surfaces, and the outer sleeve further comprises an inner surface which is located between the first and second outer locking portions and abutted against the outer abutting surface of the inner sleeve, and an inner abutting surface which is formed on an inner surface of the first outer locking portion and abutted against the outer surface of the inner sleeve.

Preferably, the inner locking portion of the inner sleeve is an annular structure and formed with a plurality of inner locking holes penetrating the first and second inner locking surfaces, the first outer locking portion is an annular structure and includes a plurality of first outer locking holes which penetrate the first outer locking portion and are aligned to the inner locking holes, the second outer locking portion of the outer sleeve is an annular structure and includes a plurality of second outer locking holes which penetrate the second outer locking portion and are aligned to the inner locking holes, when in the extended position, screws are screwed through the first outer locking holes and the inner locking holes to fix the first outer locking portion to the inner locking portion, and when in a retracted position, screws are screwed through the second outer locking holes and the inner locking holes to fix the second outer locking portion and the inner locking portion together.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-7, a length-adjustable mechanical arm in accordance with the present invention comprises: a base 20, a first arm unit 30, and a second arm unit A.

The base 20 can be pivotable or non-pivotable. In this embodiment, the base 20 is pivotable.

The first arm unit 30 has one end formed with a first pivot portion 31 pivoted to the base 20, and another end formed with a second pivot portion 32.

The second arm unit A is pivoted to the first arm unit 30 and includes a pivot member 40, an inner sleeve 50, an outer sleeve 60 and an accessory mounting seat 70.

The pivot member 40 is pivoted to the second pivot portion 32 of the first arm unit 30.

The inner sleeve 50 has one end formed with an inner fixing portion 51 fixed to the pivot member 40, another end formed with an inner locking portion 52, an outer surface 53 between the inner fixing portion 51 and the inner locking portion 52, a first inner locking surface 521 at one side of the inner locking portion 52, a second inner locking surface 522 located at another side of the inner locking portion 52 and between the first inner locking surface 521 and the inner fixing portion 51, and an outer abutting surface 523 which is formed on an outer surface of the inner locking portion 52 and located between the first and second inner locking surfaces 521, 522. The inner locking portion 52 of the inner sleeve 50 is an annular structure and formed with a plurality of inner locking holes 524 penetrating the first and second inner locking surfaces 521, 522.

Figure 5:
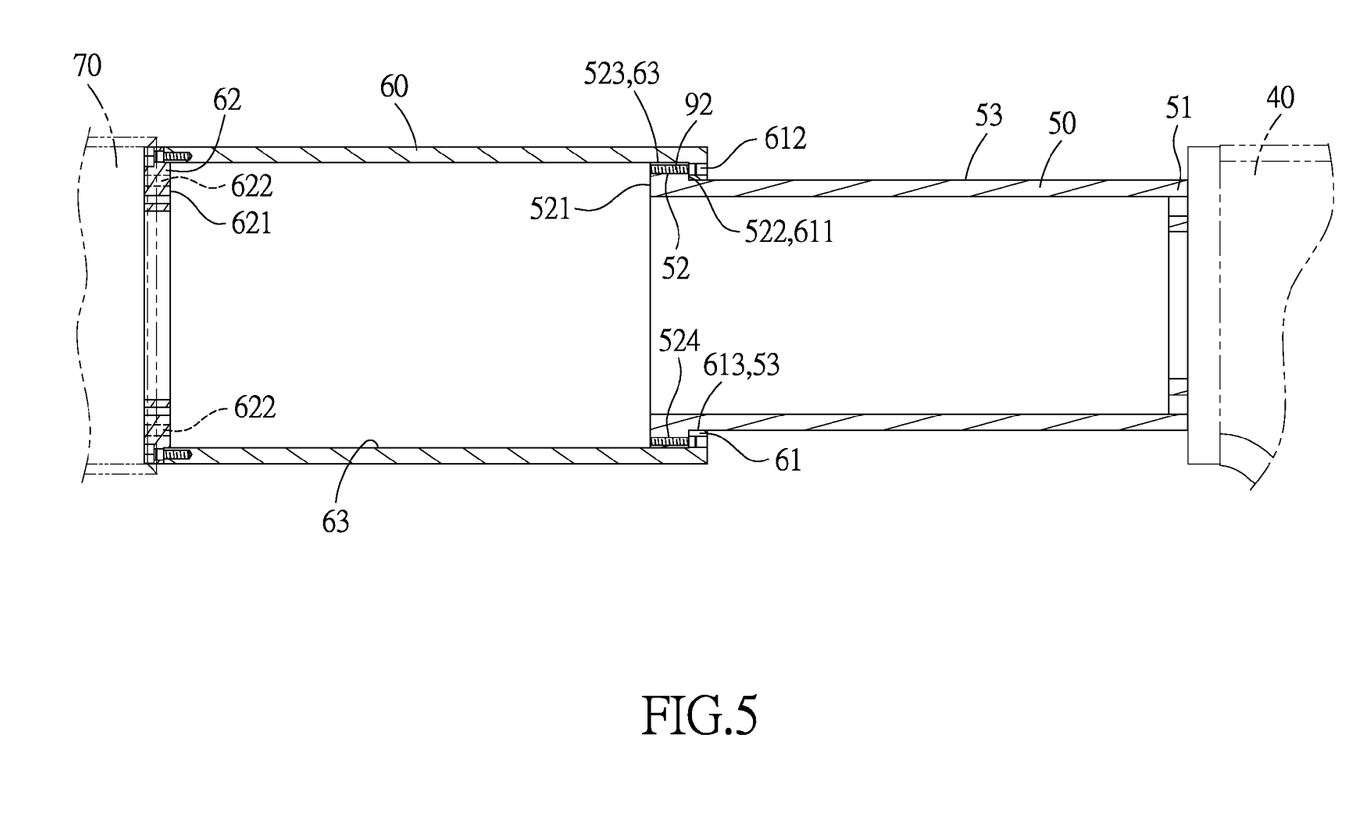
FIG. 5 is a cross sectional view of a part of FIG. 4.
Figure 7:
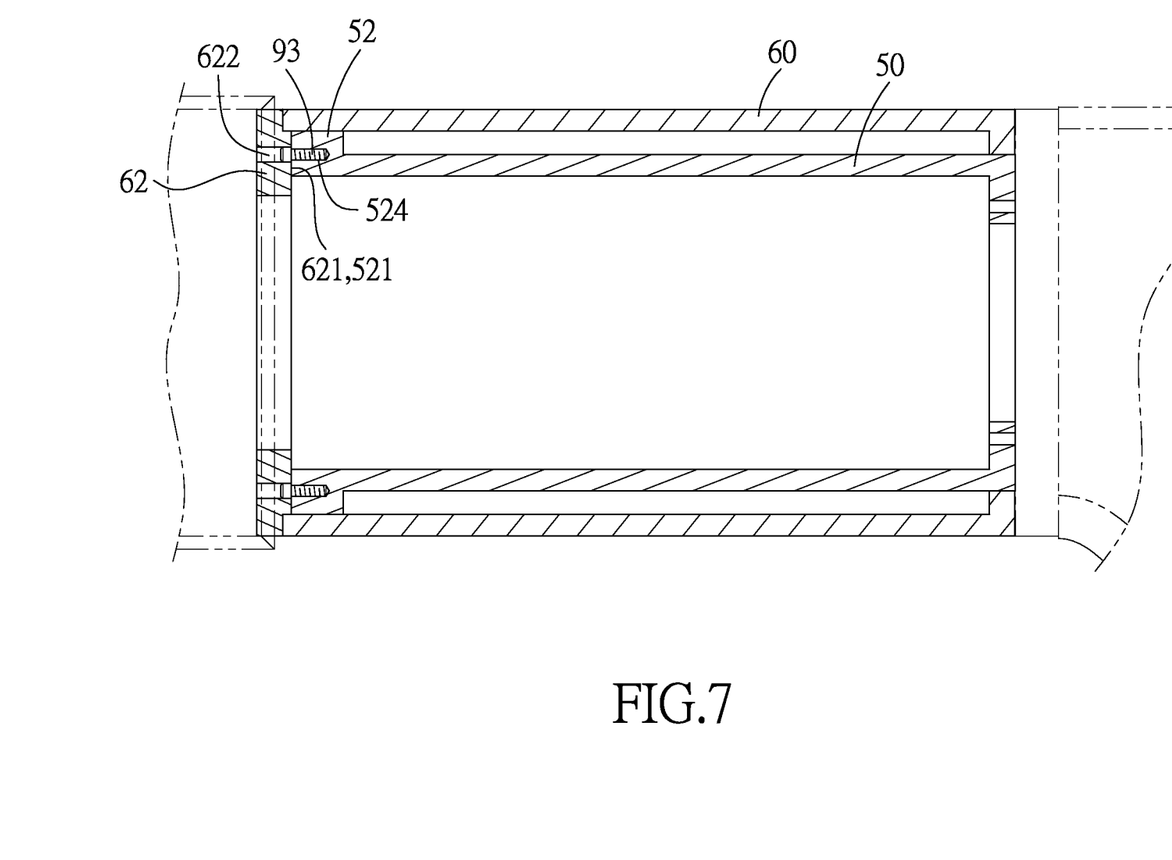
FIG. 7 is a cross sectional view of a part of FIG. 7.

The outer sleeve 60 is slidably sleeved on the inner sleeve 50 and slides between an extended position and a retracted position with respect to the inner sleeve 50. The outer sleeve 60 includes a first outer locking portion 61 located between the inner fixing portion 51 and the inner locking portion 52, and a second outer locking portion 62 which is located further away from the first outer locking portion 61 than the inner locking portion 52. When in an extended portion, as shown in FIG. 5, the first outer locking portion 61 and the inner locking portion 52 are locked to each other, and when in a retracted position, as shown in FIG. 7, the second outer locking portion 62 and the inner locking portion 52 are locked to each other. In this embodiment, the first outer locking portion 61 of the outer sleeve 60 further comprises a first outer locking surface 611 located toward the second inner locking surface 522. The second outer locking portion 62 includes an annular piece fastened to the outer sleeve 60 by screws 91, and is formed with a second outer locking surface 621 located toward the first inner locking surface 521. The first outer locking portion 61 is an annular structure and includes a plurality of first outer locking holes 612 which penetrate the first outer locking portion 61 and are aligned to the inner locking holes 524. The second outer locking portion 62 of the outer sleeve 60 is an annular structure and includes a plurality of second outer locking holes 622 which penetrate the second outer locking portion and are aligned to the inner locking holes 524. When in the extended position, the first outer locking surface 611 is abutted against the second inner locking surface 522, and the screws 92 are screwed through the first outer locking holes 612 and the inner locking holes 524 to fasten the first outer locking portion 61 to the inner locking portion 52. When in a retracted position, the second locking surface 621 is abutted against the first inner locking surface 521, and then the screws 93 are screwed in the second outer locking holes 622 and the inner locking holes 524, so that the second outer locking portion 62 is fastened to the inner locking portion 52. In addition, the outer sleeve 60 further comprises an inner surface 63 which is located between the first and second outer locking portions 61, 62 and abutted against the outer abutting surface 523 of the inner sleeve 50, and an inner abutting surface 613 which is formed on an inner surface of the first outer locking portion 61 and abutted against the outer surface 53 of the inner sleeve 50, so that the outer sleeve 60 is allowed to slide more smoothly and stably with respect to the inner sleeve 50.

Figure 2:
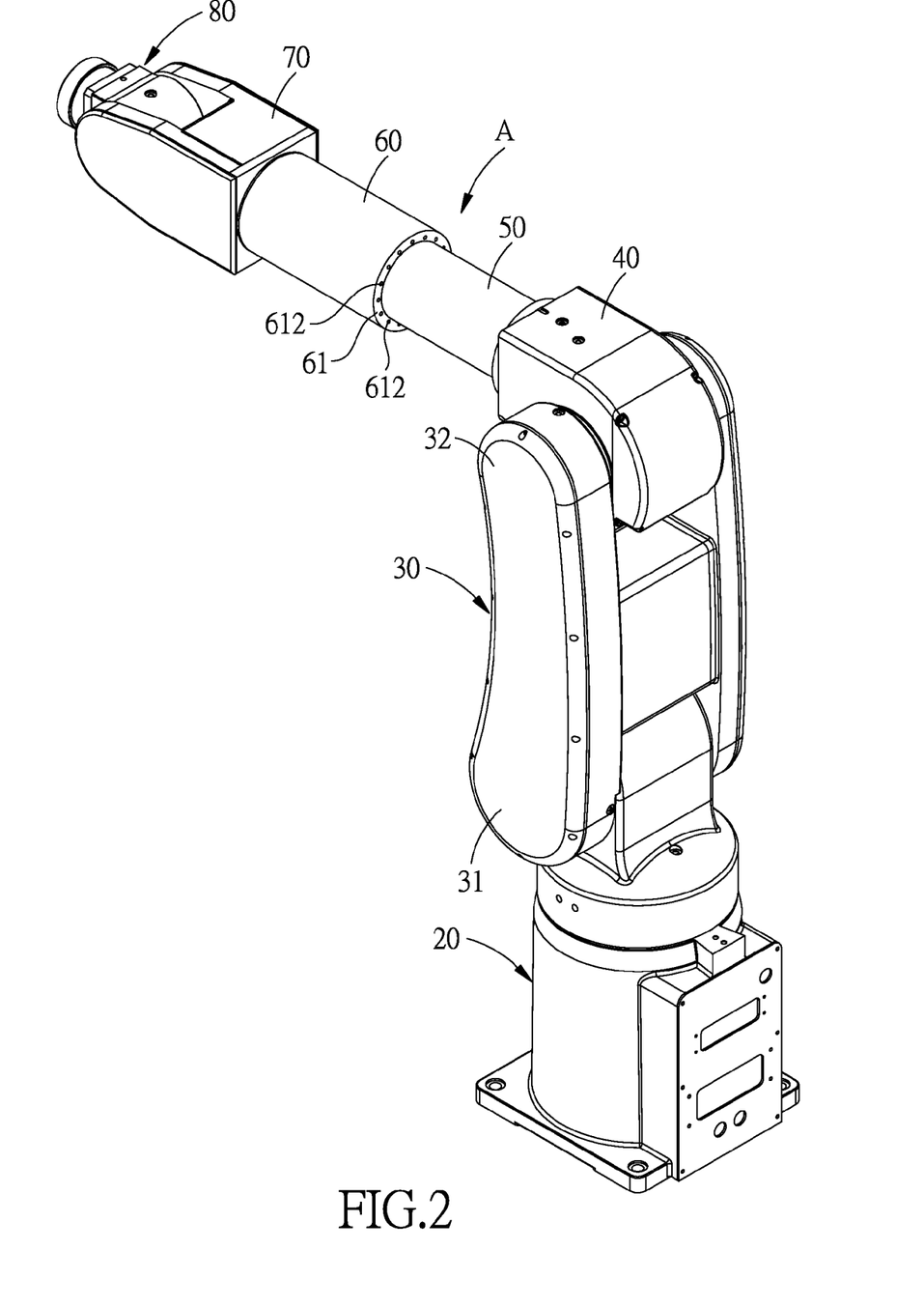
FIG. 2 is an assembly view of a length-adjustable mechanical arm in accordance with the present invention.
Figure 3:
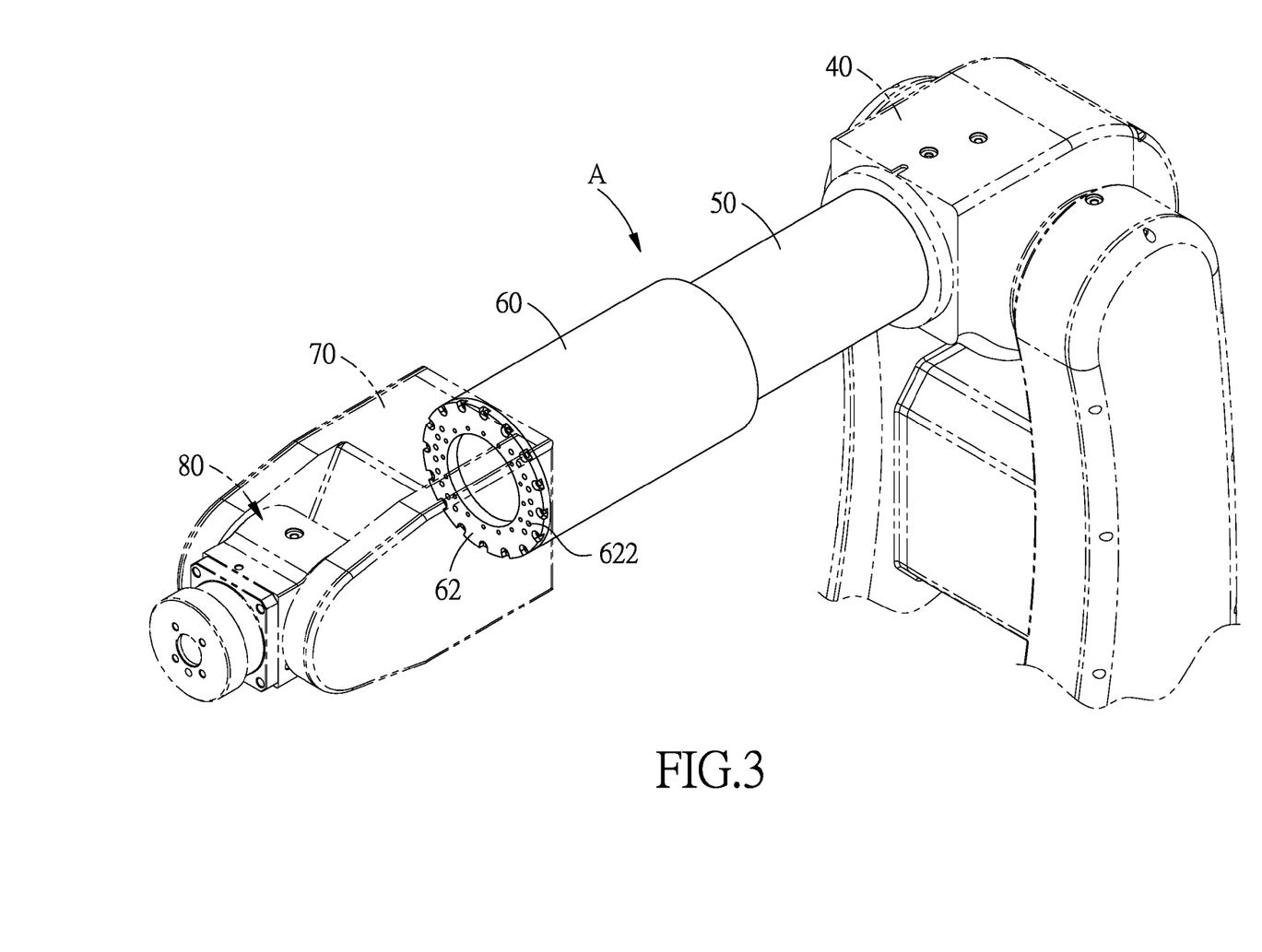
FIG. 3 is a perspective view of the length-adjustable mechanical arm in accordance with the present invention.

The accessory mounting seat 70 is fixed on the second outer locking portion 62 of the outer sleeve 60 for mounting of an accessory 80.

What mentioned above are the structural relations of the components of the preferred embodiment of the present invention, for a better understanding of the invention, its operating advantages and the specific objects attained by its uses, reference should be had to the following description.

Figure 4:
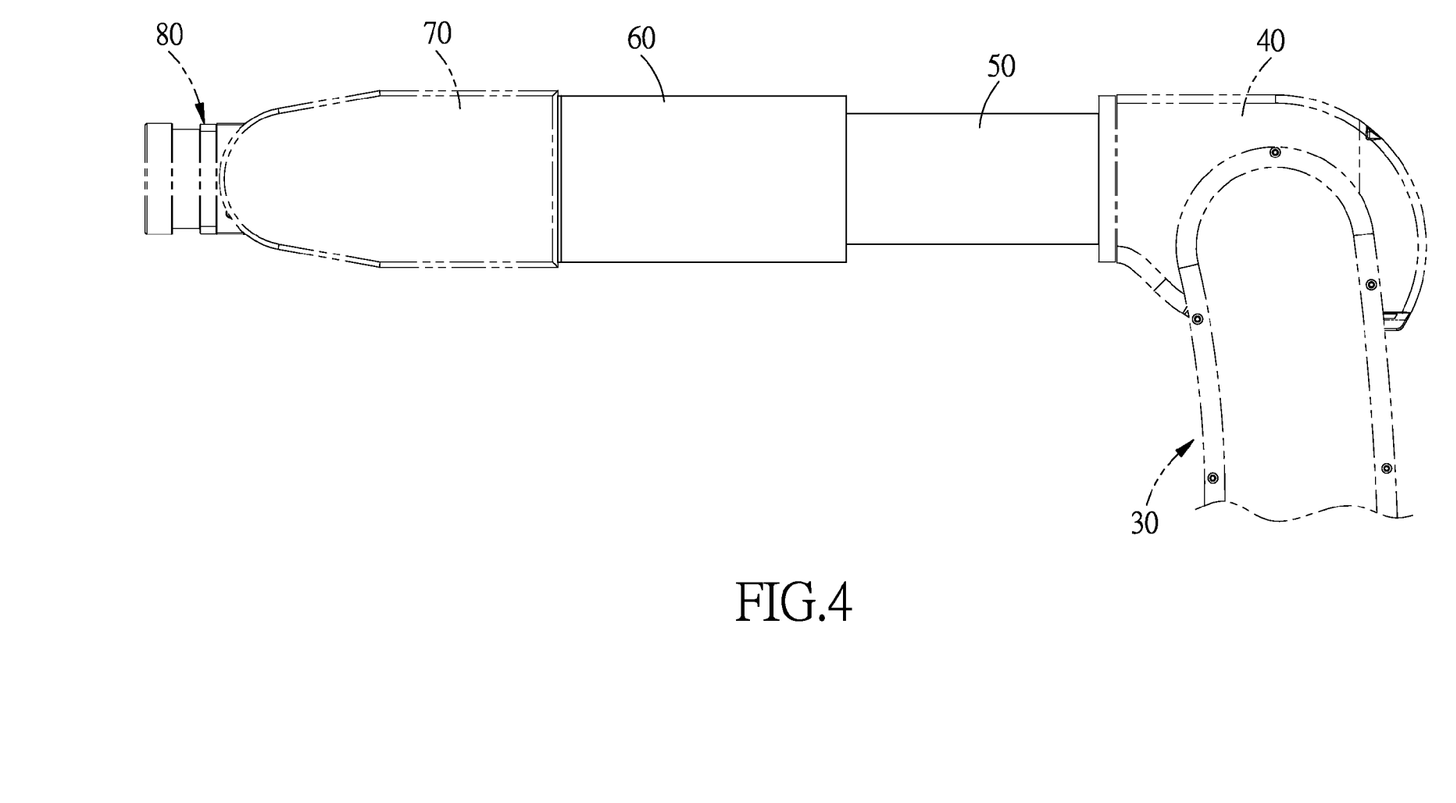
FIG. 4 is a side view showing the extended state of the second arm unit of the length-adjustable mechanical arm in accordance with the present invention.

A first distance operation is shown in FIGS. 4 and 5, the outer sleeve 60 is pulled away from the inner sleeve 50 until the first outer locking surface 611 of the first outer locking portion 61 of the outer sleeve 60 is stopped against the second inner locking surface 522 of the inner locking portion 52 of the inner sleeve 50. Then, screwed 92 can be screwed through the first outer locking holes 612 of the first outer locking portion 61 and the inner locking holes 524 of the inner locking portion 52 to fix the first outer locking portion 61 to the inner locking portion 52, so that the sleeve 60 is maintained in an extended position, the distance between the second outer locking portion 62 of the outer sleeve 60 and the inner fixing portion 51 of the inner sleeve 50 is fixed, and the mechanical arm of the present invention is switched into a first distance operation mode.

Figure 6:
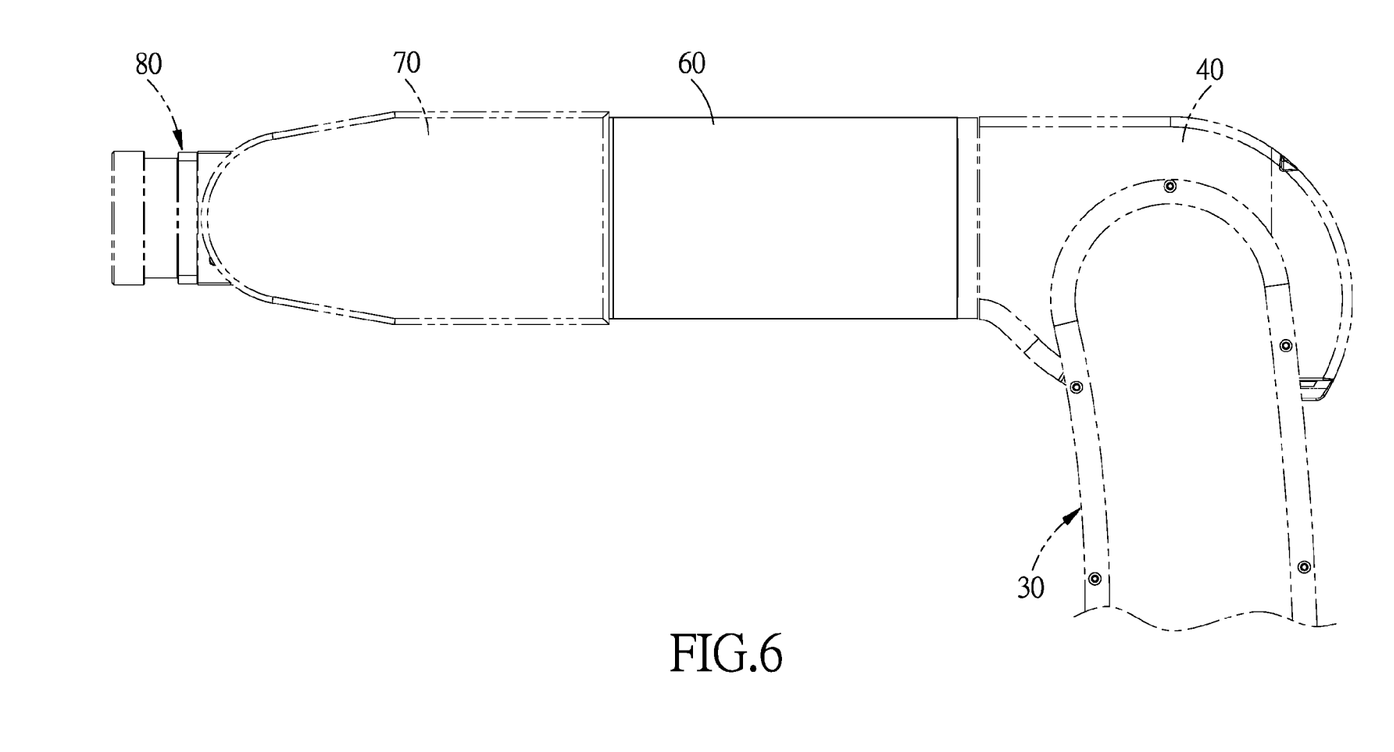
FIG. 6 is a side view showing the retracted state of the second arm unit of the length-adjustable mechanical arm in accordance with the present invention.

A second distance operation mode is shown in FIGS. 6 and 7, wherein the outer sleeve 60 is pushed toward the inner sleeve 50 until the second outer locking surface 621 of the second outer locking portion 62 of the outer sleeve 60 is stopped against the first inner locking surface 521 of the inner locking portion 52 of the inner sleeve 50. Then, screws 93 can be screwed through the second outer locking hole 622 of the second outer locking portion 62 and the inner locking holes 524 of the inner locking portion 52 to fix the second outer locking portion 62 and the inner locking portion 52 together, so that the outer sleeve 60 is maintained in a retracted position, the distance between the second outer locking portion 62 of the outer sleeve 60 and the inner fixing portion 51 of the inner sleeve 50 is fixed, and the mechanical arm of the present invention is switched into a second distance operation mode.

The length of the second arm unit A of the mechanical arm of the present invention is adjustable by adjusting the inner and outer sleeves 50, 60, and the second arm unit A is switchable between an extended position and a retracted position. Therefore, the mechanical arm of the present invention can be used for two distance operation.

While we have shown and described various embodiments in accordance with the present invention, it is clear to those skilled in the art that further embodiments may be made without departing from the scope of the present invention.

What is claimed is:

1. A length-adjustable mechanical arm comprising:
a base;
a first arm unit including one end formed with a first pivot portion pivoted to the base, and another end formed with a second pivot portion;
a second arm unit pivoted to the first arm unit and including a pivot member, an inner sleeve, an outer sleeve and an accessory mounting seat;
wherein the pivot member is pivoted to the second portion of the first arm unit, the inner sleeve has one end formed with an inner fixing portion fixed to the pivot member, another end formed with an inner locking portion, the outer sleeve is slidably sleeved on the inner sleeve and slides between an extended position and a retracted position with respect to the inner sleeve, the outer sleeve includes a first outer locking portion located between the inner fixing portion and the inner locking portion, and a second outer locking portion which is located further away from the first outer locking portion than the inner locking portion, when in the extended portion, the first outer locking portion and the inner locking portion are fixed to each other, and when in the retracted position, the second outer locking portion and the inner locking portion are fixed to each other, the accessory mounting seat is fixed on the second outer locking portion of the outer sleeve;

the inner locking portion of the inner sleeve is an annular structure and formed with a plurality of inner locking holes penetrating the first and second inner locking surfaces, the first outer locking portion is an annular structure and includes a plurality of first outer locking holes which penetrate the first outer locking portion and are aligned to the inner locking holes, the second outer locking portion of the outer sleeve is an annular structure and includes a plurality of second outer locking holes which penetrate the second outer locking portion and are aligned to the inner locking holes, when in the extended position, screws are screwed through the first outer locking holes and the inner locking holes to fix the first outer locking portion to the inner locking portion, and when in a retracted position, screws are screwed through the second outer locking holes and the inner locking holes to fix the second outer locking portion and the inner locking portion together.

2. The length-adjustable mechanical arm as claimed in claim 1, wherein the inner sleeve further includes a first inner locking surface at one side of the inner locking portion, a second inner locking surface which is located at another side of the inner locking portion and between the first inner locking surface and the inner fixing portion, the first outer locking portion of the outer sleeve further comprises a first outer locking surface located toward the second inner locking surface, the second outer locking portion includes a second outer locking surface located toward the first inner locking surface, when in the extended position, the first outer locking surface is abutted against the second inner locking surface, and when in the retracted position, the second outer locking surface is abutted against the first inner locking surface.

3. The length-adjustable mechanical arm as claimed in claim 1, wherein the inner sleeve includes an outer surface between the inner fixing portion and the inner locking portion, and an outer abutting surface which is formed on an outer surface of the inner locking portion and located between the first and second inner locking surfaces, and the outer sleeve further comprises an inner surface which is located between the first and second outer locking portions and abutted against the outer abutting surface of the inner sleeve, and an inner abutting surface which is formed on an inner surface of the first outer locking portion and abutted against the outer surface of the inner sleeve.

\* \* \* \* \*